Figure 10:
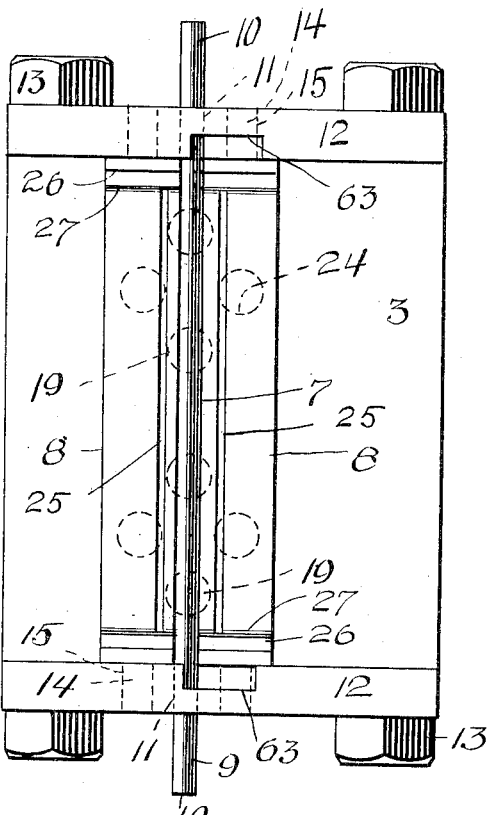

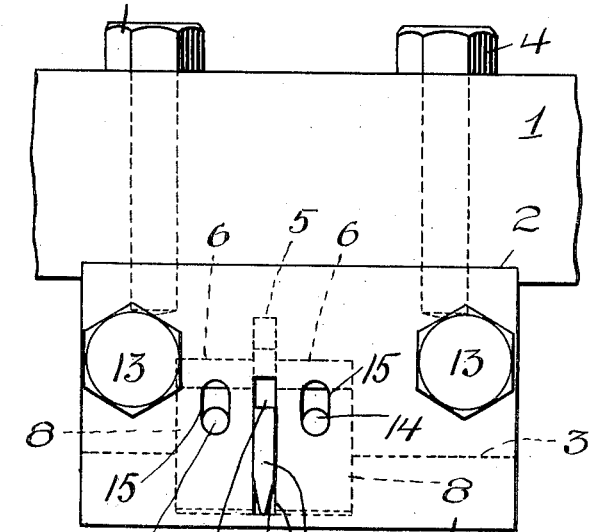

J. GABRIELSON.
DIES FOR MAKING RADIATOR TUBES.
APPLICATION FILED AUG. 5, 1913.
1,089,124.
Patented Mar. 3, 1914.
7 SHEETS—SHEET 2.
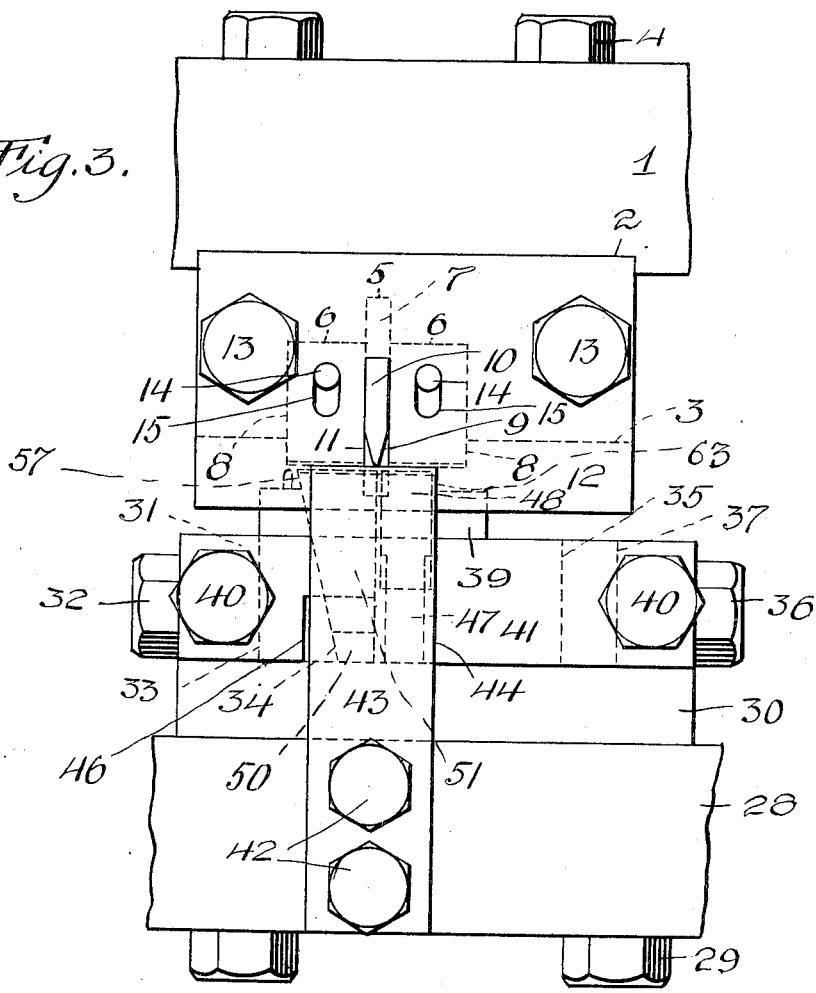
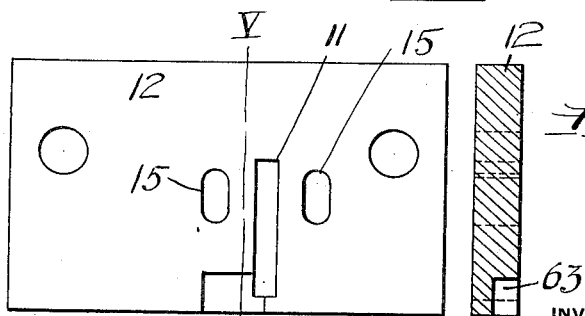
WITNESSES
Samuel Payne
Karl H. Butler
INVENTOR
J. Gabrielson
By Henry C. Evert
ATTORNEY J. GABRIELSON.
DIES FOR MAKING RADIATOR TUBES.
APPLICATION FILED AUG. 5, 1913.
1,089,124.
Patented Mar. 3, 1914.
7 SHEETS—SHEET 3.
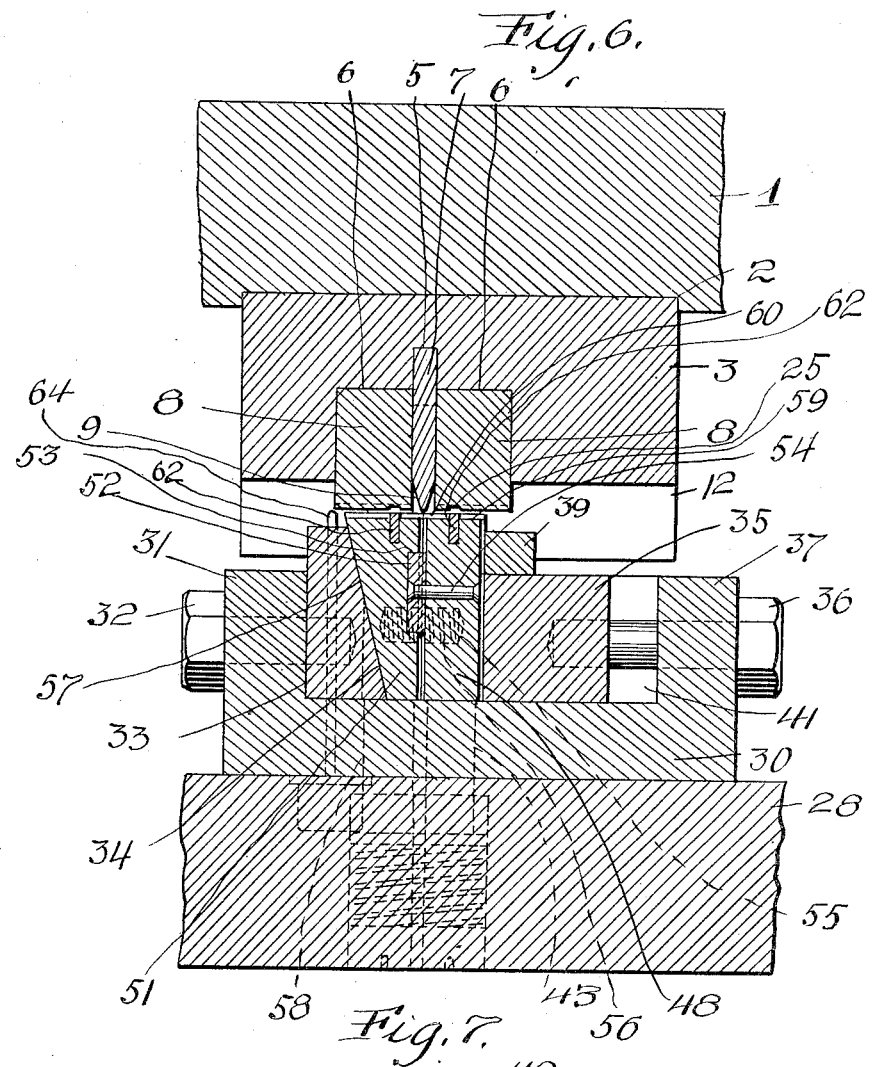
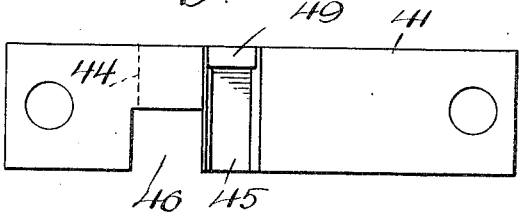
WITNESSES
Samuel Payne
Karl H. Butler
INVENTOR
J. Gabrielson
By Henry C. Evert
ATTORNEY J. GABRIELSON.
DIES FOR MAKING RADIATOR TUBES.
APPLICATION FILED AUG. 5, 1913.
1,089,124.
Patented Mar. 3, 1914.
7 SHEETS—SHEET 4.
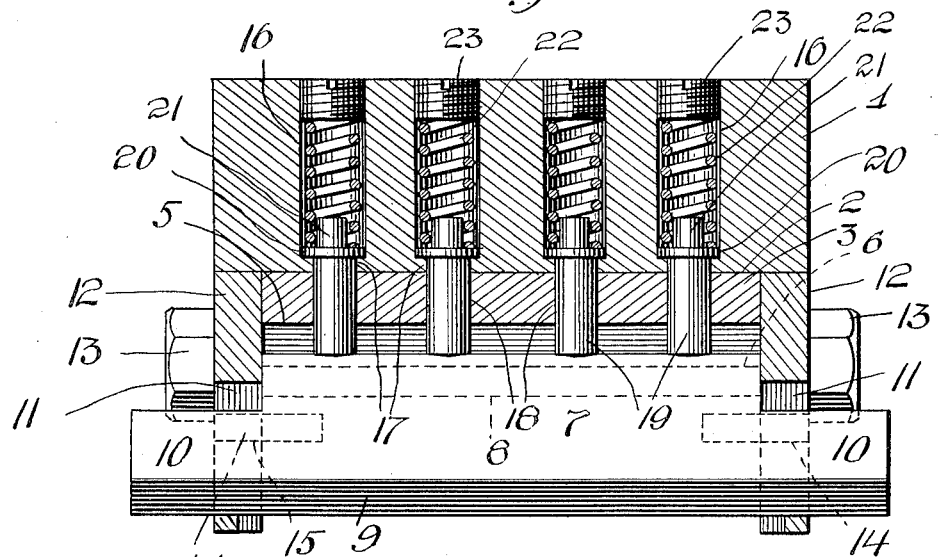
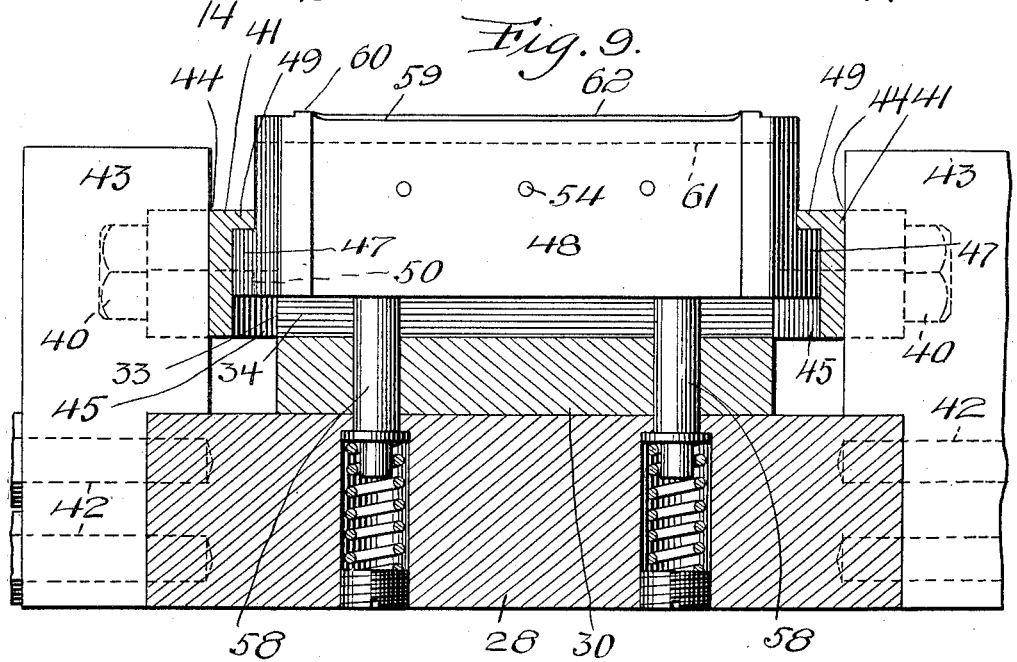
WITNESSES
Samuel Payne.
Karel H. Butler
INVENTOR
J. Gabrielson.
By Henry C. Evert
ATTORNEY

J. GABRIELSON.
DIES FOR MAKING RADIATOR TUBES.
APPLICATION FILED AUG. 5, 1913.

1,089,124.

Patented Mar. 3, 1914.
7 SHEETS—SHEET 5.

WITNESSES
Samuel Payne.
Karl H. Butler

INVENTOR
J. Gabrielson.
By Henry C. Evert
ATTORNEY

J. GABRIELSON.
DIES FOR MAKING RADIATOR TUBES.
APPLICATION FILED AUG. 5, 1913.
1,089,124.
Patented Mar. 3, 1914.
7 SHEETS—SHEET 6.
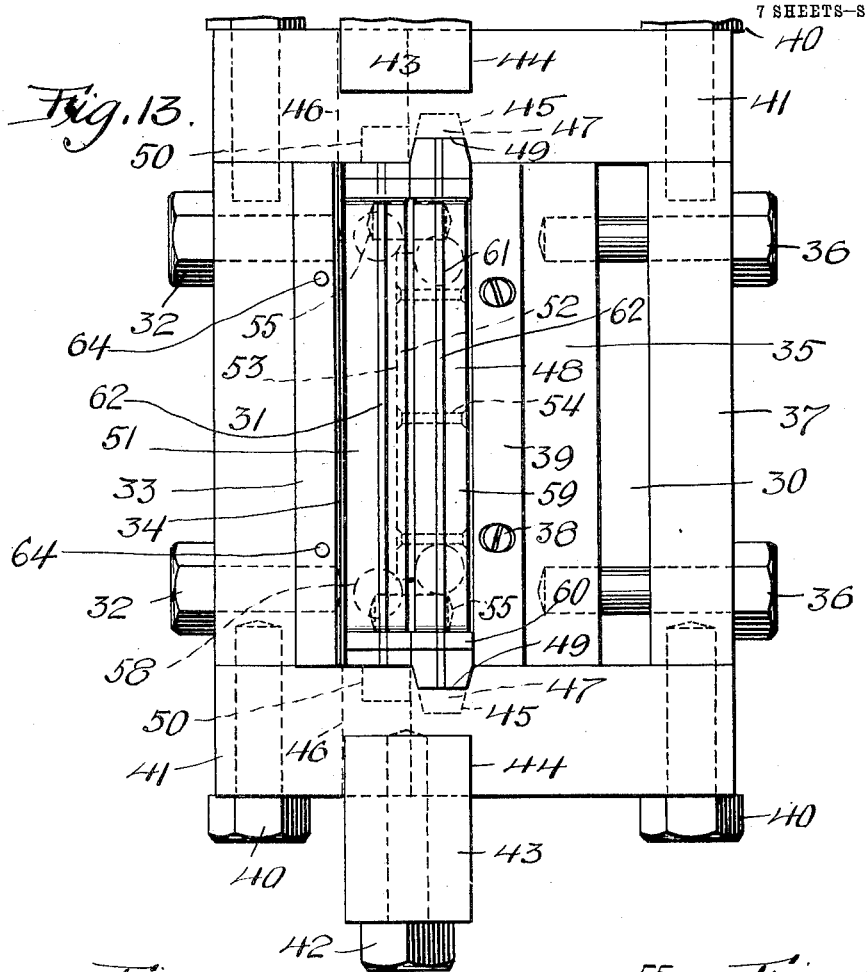
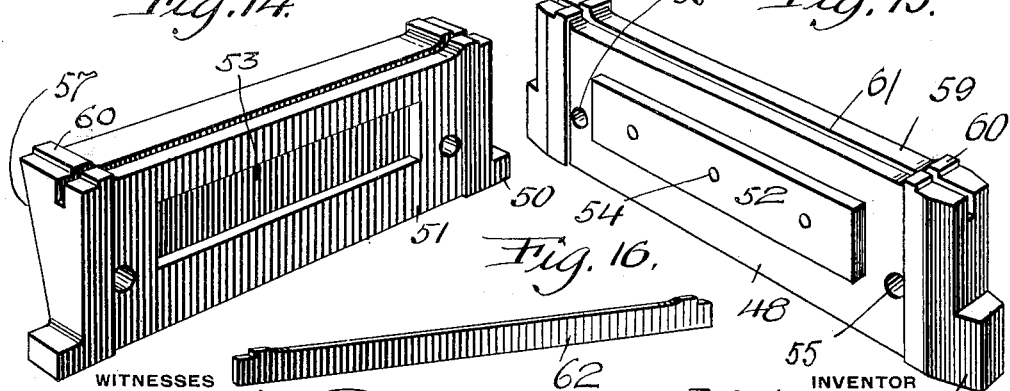
WITNESSES
INVENTOR
J. Gabrielson
By Henry C. Evert
ATTORNEY J. GABRIELSON.
DIES FOR MAKING RADIATOR TUBES.
APPLICATION FILED AUG. 5, 1913.
1,089,124.
Patented Mar. 3, 1914.
7 SHEETS—SHEET 7.
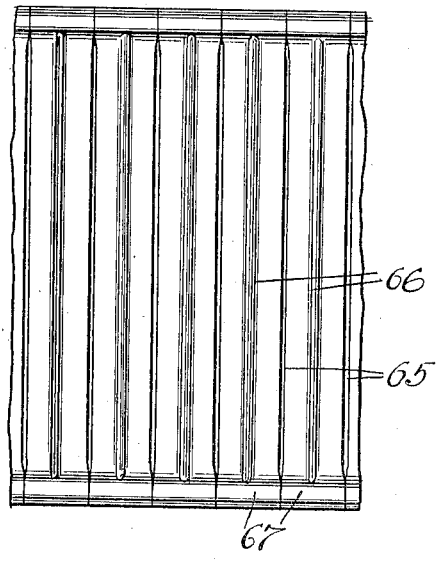
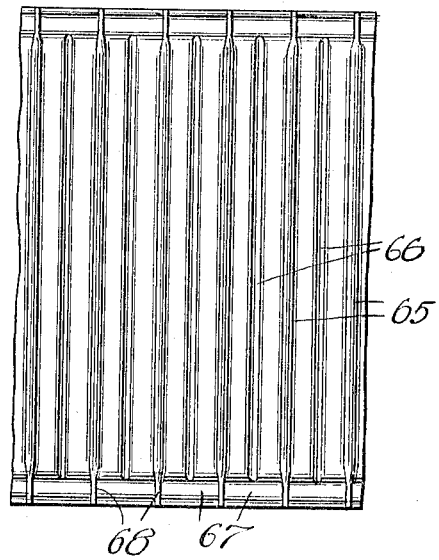
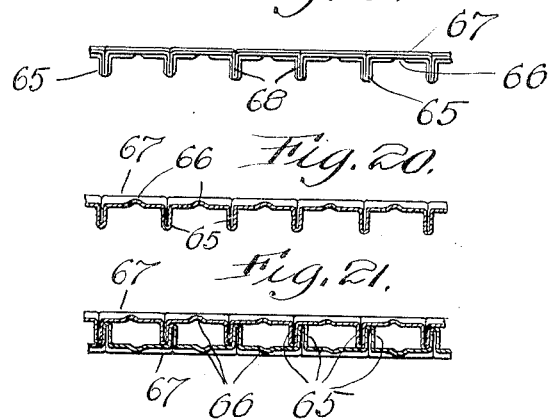

UNITED STATES PATENT OFFICE.

JOHN GABRIELSON, OF BUFFALO, NEW YORK.

DIES FOR MAKING RADIATOR-TUBES.

1,089,124.  Specification of Letters Patent.  Patented Mar. 3, 1914.

Application filed August 5, 1913. Serial No. 783,149.

*To all whom it may concern:*

Be it known that I, JOHN GABRIELSON, a subject of the King of Sweden, residing at Buffalo, in the county of Erie and State of New York, have invented certain new and useful Improvements in Dies for Making Radiator-Tubes, of which the following is a specification, reference being had therein to the accompanying drawing.

This invention relates to dies for making radiator tubes, and more particularly to that type of tube used in connection with automobiles and the internal combustion engines of various kinds of vehicles and crafts.

The primary object of my invention is to accomplish by one operation what has heretofore required several operations for the production of metallic sheets that can be secured together to form a radiator tube or wall.

Another object of this invention is to provide novel dies that can be used in an ordinary press for producing ribbed and fluted sheets of metal which can be placed together to form a plurality of tubes or a wall having compartments formed therein.

A further object of this invention is to provide novel yieldable dies for pressing sheet metal and ribbing the same, the dies being arranged whereby a sheet of metal can be pressed and properly shaped without any danger of the metal being cracked or unduly injured while its contour is being changed.

A still further object of this invention is to provide pressing dies of the above type consisting of comparatively few parts that are easy to assemble, durable, and highly efficient for the purposes for which they are intended.

With the above and other objects in view the invention resides in the novel construction, combination and arrangement of parts to be hereinafter specifically described and then claimed.

Reference will now be had to the drawings, wherein:—

Figure 11:
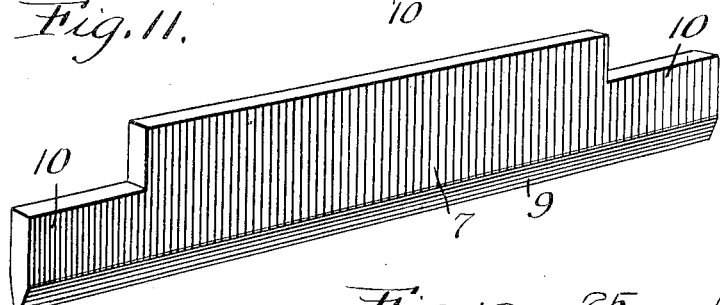
Figure 12:
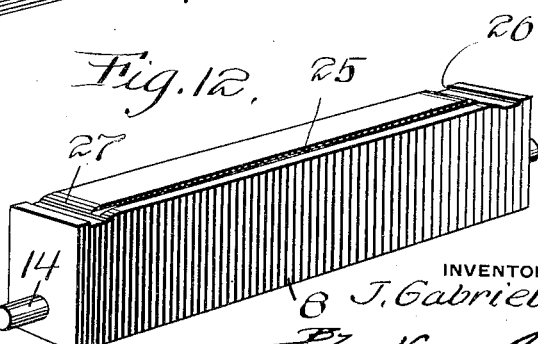

Figure 1 is an end view of a male die, Fig. 2 is a similar view of the female die, Fig. 3 is an end view of the male and female dies in a closed position, Fig. 4 is an elevation of an end plate adapted to form part of the male die, Fig. 5 is a cross sectional view taken on the line V—V of Fig. 4, Fig. 6 is a vertical cross sectional view of the dies in a closed position, Fig. 7 is an elevation of an end plate of the female die, Fig. 8 is a longitudinal sectional view of the male die, Fig. 9 is a similar view of the female die, Fig. 10 is a bottom plan of the male die, Fig. 11 is a perspective view of a detached shaping blade of the male die, Fig. 12 is a perspective view of a detached forming member of the male die, Fig. 13 is a plan of the female die, Fig. 14 is a perspective view of a forming member of the female die, Fig. 15 is a similar view of another member, Fig. 16 is a perspective view of a detached shaping rib of the female die, Fig. 17 is a plan of the outer side of a pressed sheet of metal produced by the dies, Fig. 18 is a similar view of the inner side of the same, Fig. 19 is an end view of the pressed sheet of metal, Fig. 20 is a sectional view of the same, and Fig. 21 is a sectional view of two pressed sheets of metal placed together to form a tube or wall.

In describing my invention by aid of the drawings above referred to I desire to point out that I intend said views as merely illustrative of an example whereby my invention may be applied in practice, and I do not limit my claims to the precise arrangement and construction of parts indicated. The following description is therefore to be construed broadly as including substitute arrangements and constructions which are the obvious equivalent of those shown.

Reference will first be had to Figs. 1, 3, 4, 5, 6, 8, and 10 to 12 inclusive, showing the male die and the parts thereof. The male die is movable relatively to the female die and the reference numeral 1 denotes, by the way of an example, a head adapted to form part of a pressing machine. The bottom side of the head is recessed, as at 2 to accommodate a head block 3 that is secured to said head by screw bolts 4 or other fastening means. The block 3 has the bottom side thereof provided with longitudinal seats 5 and 6 for a longitudinal shaping blade 7 and longitudinal forming members 8. The shaping blade 7, which has a beveled edge 9 is interposed between the forming members 8 and said blade has the ends thereof provided with extensions 10 that protrude through slots 11 provided therefor in end plates 12, secured to the ends of the block 3 by screw bolts 13 or other fastening means. The forming members 8 have the ends thereof provided with guide pins 14 and these pins extend into slots 15 provided therefor in the end plates 12. The head 1, directly above the shaping blade 7 has a row of sockets 16 and these sockets are in communication with vertical openings 17 and 18 formed in the head 1 and the block 3. Movable in the openings 17 and 18 are vertical push pins 19 that normally engage the upper edge of the shaping blade 7. The push pins 19 have heads 20 and guide posts 21 within the sockets 16 and engaging said heads and encircling said posts are the lower convolutions of coiled compression springs 22 that are retained within said sockets by screw plugs 23 mounted in the upper ends thereof. The elements 19 to 23 constitute yieldable means for holding the shaping blade 7. The head 1 and the block 3 have similar yieldable means 24 for the forming members 8, but the yieldable means of the shaping blade is of greater tension or consists of a larger number of units than the yieldable means of the forming members, whereby the forming members will yield in advance of the shaping blade, the object of which will hereinafter appear. The forming members 8 have the bottom and lower faces thereof provided with longitudinal grooves 25 and the ends of said grooves terminate in transverse grooves 26 at the ends of said forming members. The inner walls of the grooves 26 are beveled or rounded off, as at 27 and the shape of the pressing faces of said forming members is such as to produce a certain formation of a sheet of metal when said forming members coöperate with the female die.

Reference will now be had to Figs. 2, 3, 6, 7, 9 and 13 to 16 inclusive, showing the female die. The female die comprises a bed plate 28 and secured to said bed plate by screw bolts 29 or other fastening means is a stationary block 30. The block 30 is channel-shaped, and arranged against the wall 31 of said block and secured thereon by screw bolts 32 or other fastening means is a guide block 33 having a beveled wall 34. Arranged in the channel block 30 is another guide block 35 that is adjustably held by screw bolts 36 or other fastening means, said screw bolts being arranged in the wall 37 of the block 30. The guide block 35 has a vertical wall which confronts the beveled wall 34 of the block 33 and secured on top of the guide block 35 by screws 38 or other fastening means is an adjustable guide block 39. Connected to the ends of the block 30 by screw bolts 40 or other fastening means are end plates 41 and connected to the bed plate 28 by screw bolts 42 are stop blocks 43 that extend over the bed plate and upwardly through grooves 44 provided therefor in the outer sides of the end plates 41. The inner sides of the end plates 41 are recessed, as at 45 and slotted, as at 46. The recesses 45 accommodate the tongues 47 of a forming member 48 that is limited in its upward movement by the tongues 47 engaging lugs 49 at the upper ends of the recesses 45. The slots 46 accommodate the tongue 50 of a forming member 51, said tongues also limiting the upward movement of said forming member.

Considering the forming members as shown in Figs. 14 and 15, the member 48 is associated with the guide blocks 35 and 39 and said member has the inner face thereof provided with a longitudinal tenon 52 that fits in a mortise 53 provided therefor in the forming member 51. The tenon 52 is held by rivets 54, and said tenon interlocks the forming members whereby said members are moved in unison in one direction. The confronting sides of the members 48 and 51, at the ends thereof, are provided with confronting sockets 55 and located in said sockets are coiled compression springs 56. The outer face of the forming member 51 is beveled, as at 57 to engage the beveled wall 34 of the guide block 33, and supporting the forming members normally elevated are push pins 58 forming part of yieldable means located in the block 30 and the bed plate 28. The yieldable means is constructed the same as the yieldable means of the male die heretofore referred to. The pressing faces of the forming members 48 and 51 are longitudinally recessed, as at 59 to provide ribs 60 adjacent to the ends of said members. The pressing faces also have longitudinal grooves 61 throughout the length of said members and mounted in said grooves are shaping ribs 62.

In order that the male die can be moved into proximity to the female die, the end plates 12 of the male die are recessed, as at 63 to provide clearance for the ends of the forming member 48 (see Fig. 8).

The guide block 33 has vertical pins 64 and these pins are employed for slightly bending a sheet of metal when a sheet is pressed between said ties.

Before considering the operation of the dies it is thought best to consider the article produced, which is shown in Figs. 17 to 21 inclusive. In the first place, the tube or wall is produced by securing together two pieces of material that have been stamped, pressed or shaped whereby when the two pieces of material are placed together there will be a plurality of independent cells or tubes. Each piece of material is identical and to form a wall or cellular body the pieces are placed together whereby ribs will space apart the pieces and provide longitudinal tubes or cells that are in parallelism. Each piece of material is preferably made of light and durable sheet brass and after a piece has been pressed, it has equally spaced longitudinal parallel two-ply ribs 65 extending from one end of the piece of material to the opposite end thereof. Intermediate the ribs 65 are longitudinal parallel flutes 66 and the ends of these flutes terminate in raised portions 67 at the ends of the piece of material. In producing the raised portions 67 the two-ply ribs 65 are more compactly produced, that is, the plies actually contact, as indicated at 68.

In operation, I will assume that the male die is elevated relatively to the female die and the forming members 48 and 51, shaping blade 7 and the forming members 8 are in an extended position. By reference to Fig. 1 it will be observed that the movement of the shaping blade 7 and the forming members is limited by the slots 11 and 15 and that the extended position of the forming members 48 and 51 produces a slot between said members. The piece of sheet brass to be pressed and stamped to conform in shape to that shown in Figs. 17 to 20 inclusive is placed upon the pressing faces of the members 48 and 51. When the male die is lowered the sheet of metal is pressed by the shaping ribs 62 into the grooves 25 of the forming members 8 to provide the flutes 66. Simultaneous with this formation the shaping blade 7 forces the material between the forming members 48 and 51 and as the male die further descends, the forming members 8, 48 and 51 yield. It is the yielding movement of the forming members 8 in advance of the yielding movement of the shaping blade 7 that allows said blade to properly depress the sheet of metal between the forming members 48 and 51, whereby as the forming member 51 is lowered it rides into closer proximity to the member 48 and causes the two-ply rib to be compressed, particularly the reduced ends of the rib which are caught between the ends of the members 48 and 51. Simultaneous with the formation of the rib 65 and the flute 66 the ends of the piece of material are pressed by the ribs 60 of the members 48 and 51 into the grooves 26 of the forming members 8, thereby producing the raised portions 67 at the ends of the piece of material. The edge of the piece of material is bent out of a horizontal plane by resting upon the pins 64 and the bent or kinked portion of the metallic plate indicates or serves as a guide for again positioning the plate to be ribbed and fluted. The bent or kinked portion of the plate is placed directly above the gap between the forming members 48 and 51 and with the already-formed rib resting upon the auxiliary guide 39 and spaced from the forming member 48, whereby as the next rib is formed the previously formed rib will be moved into engagement with the side of the forming member 48. This operation is repeated until the entire width of the piece of metal has been provided with longitudinal ribs and flutes and when two pieces of metal have been so shaped they can be fitted together and secured to form tubes or a cellular wall, as shown in Fig. 21.

The stop blocks 43 are engaged by the extended ends 10 of the shaping blade, consequently the downward movement of said shaping blade is limited, as shown in Fig. 3, and the piece of material prevented from being injured should there be a greater compression of the forming members than is actually necessary for shaping a piece of material.

What I claim is:—

1. Dies of the type described, comprising yieldable forming members, a yieldable shaping blade arranged between said members, interlocked yieldable forming members providing a gap between which material is compressed by said blade to produce a rib, one of said members moving in a horizontal plane to coöperate with the other of said members and said blade in shaping a rib, shaping ribs carried by said interlocked members and coöperating with the first-mentioned members in fluting a piece of material, and means in connection with all of said forming members for producing raised portions at the ends of the flutes of a piece of material.

2. Dies of the type described, comprising yieldable forming members, a yieldable shaping blade arranged between said members, interlocked yieldable forming members providing a gap between which material is compressed by said blade to produce a rib, one of said members moving in a horizontal plane to coöperate with the other of said members and said blade in shaping a rib, shaping ribs carried by said interlocked members and coöperating with the first-mentioned members in fluting a piece of material, means in connection with all of said forming members for producing raised portions at the ends of the flutes of a piece of materials, and means including push pins for yieldably supporting said forming members and said blade, said means being disposed whereby the first-mentioned forming members can yield in advance of said blade.

3. In the manufacture of radiator tubes, a male die and a female die, said male die comprising a block, forming members yieldably arranged in said block, a shaping blade yieldably mounted between said forming members, means at the ends of said block for supporting and limiting the movement of said forming members and said blade, and said female die comprising a channel block, guide blocks arranged therein, interlocked forming members arranged between said guide blocks, means for yieldably supporting said forming members whereby one of said members can move in a horizontal plane relatively to the others, and shaping ribs carried by the last-mentioned forming members and coöperating with the members of said male die in fluting a piece of material forced between the members of said female die by the shaping blade of said male die.

In testimony whereof I affix my signature in the presence of two witnesses.

JOHN GABRIELSON.

Witnesses:
GEORGE W. GLEBER,
J. WM. TURKELL.

Copies of this patent may be obtained for five cents each, by addressing the "Commissioner of Patents, Washington, D. C."